United States Patent
Sugihara et al.

(10) Patent No.: US 9,039,169 B2
(45) Date of Patent: May 26, 2015

(54) SUPPORT MEMBER FOR WEARABLE INSTRUMENT AND HEAD-MOUNTED WEARABLE DEVICE

(71) Applicant: OLYMPUS CORPORATION, Tokyo (JP)

(72) Inventors: Ryohei Sugihara, Machida (JP); Seiji Tatsuta, Hachioji (JP); Kengo Kitaichi, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/264,157

(22) Filed: Apr. 29, 2014

(65) Prior Publication Data

US 2014/0231474 A1 Aug. 21, 2014

Related U.S. Application Data

(63) Continuation of application No. PCT/JP2012/007376, filed on Nov. 16, 2012.

(30) Foreign Application Priority Data

Dec. 1, 2011 (JP) .................. 2011-263923

(51) Int. Cl.
```
G02C 1/00      (2006.01)
A45F 5/00      (2006.01)
G02B 7/00      (2006.01)
G02C 11/00     (2006.01)
G02B 27/01     (2006.01)
G02C 5/14      (2006.01)
```
(52) U.S. Cl.
CPC . *A45F 5/00* (2013.01); *G02B 7/002* (2013.01); *G02B 2027/0156* (2013.01); *G02B 2027/0178* (2013.01); *G02B 27/0176* (2013.01); *G02C 5/143* (2013.01); *G02C 11/10* (2013.01)

(58) Field of Classification Search
USPC ............ 351/158, 121, 123, 41, 111; 359/630, 359/631, 633, 638; 345/7, 8
See application file for complete search history.

(56) References Cited

U.S. PATENT DOCUMENTS 4,753,514 A * 6/1988 Kubik ........................... 359/618
5,886,822 A    3/1999 Spitzer (Continued)

FOREIGN PATENT DOCUMENTS

JP   H3048218 A   3/1991
JP   H8036143 A   2/1996

(Continued)

OTHER PUBLICATIONS

Japanese Office Action dated Jun. 18, 2013 in Japanese Patent Application No. 2011-263923.

(Continued)

*Primary Examiner* — Hung Dang
(74) *Attorney, Agent, or Firm* — Scully, Scott, Murphy & Presser, PC

(57) ABSTRACT

A support member for a wearable instrument which is mounted on a user's head part in cooperation with an eyeglass frame includes a head-contact portion that comes in contact with the user's head part, a temple-contact portion that comes in contact with a temple part of the eyeglass frame on a surface opposite of the head-contact portion, an instrument-connection portion for a wearable instrument that is disposed on the side of the temple-contact portion. Here, the temple-contact portion 30 has a first contact surface that comes in contact with a head-side surface of the temple part.

20 Claims, 13 Drawing Sheets

(56) References Cited

U.S. PATENT DOCUMENTS

| | | | |
|---|---|---|---|
| 8,123,352 B2* | 2/2012 | Matsumoto et al. | 351/158 |
| 2008/0106693 A1* | 5/2008 | Wang | 351/158 |
| 2009/0182688 A1 | 7/2009 | van der Zwan et al. | |
| 2010/0103076 A1 | 4/2010 | Yamamoto | |
| 2012/0069448 A1 | 3/2012 | Sugihara et al. | |

FOREIGN PATENT DOCUMENTS

| | | |
|---|---|---|
| JP | 2001522063 A | 11/2001 |
| JP | 200867285 A | 3/2008 |
| JP | 2008542820 A | 11/2008 |
| JP | 2011160166 A | 8/2011 |
| JP | 201263627 A | 3/2012 |
| JP | 201346143 A | 3/2013 |

OTHER PUBLICATIONS

Chinese Office Action dated Dec. 17, 2014 from related Chinese Application No. 201280058208.8, together with an English language translation.

* cited by examiner

SUPPORT MEMBER FOR WEARABLE INSTRUMENT AND HEAD-MOUNTED WEARABLE DEVICE

This application claims priority to Japanese Patent Application No. 2011-263923 filed on Dec. 1, 2011, the contents of which are incorporated herein by reference in its entirety.

BACKGROUND

The present invention relates to a support member used to mount a wearable instrument on an eyeglass frame and a head-mounted wearable device including the support member.

In recent years, it has been known that a wearable instrument such as a head-mounted display device is mounted on an eyeglass frame which is mountable on a head part of a user. For example, JP-A-2008-244658 discloses that a wearable instrument is mounted on an eyeglass frame using a clip. JP-A-2010-91748 and JP-A-2001-522064 disclose that a member having an attachment is screwed to an eyeglass frame and a wearable instrument is detachably mounted on the attachment.

SUMMARY

Accordingly, there is provided a support member for a wearable instrument which is mounted on a user's head part in cooperation with an eyeglass frame, including: a head-contact portion that comes in contact with the user's head part; a temple-contact portion that comes in contact with a temple part of the eyeglass frame on a surface opposite of the head-contact portion; an instrument-connection portion for a wearable instrument that is disposed on the side of the temple-contact portion, in which the temple-contact portion has a first contact surface that comes in contact with a head-side surface of the temple part.

DESCRIPTION OF THE PREFERRED EMBODIMENTS

Figure 1A:
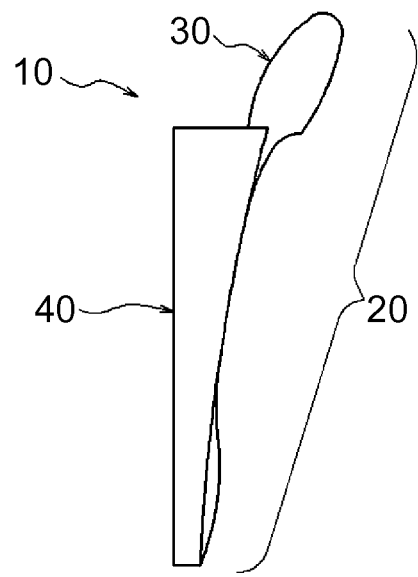
FIGS. 1A-1C illustrate a support member according to a first embodiment.

According to some aspects, it is possible to provide a support member for a wearable instrument and a head-mounted wearable device which can be easily mounted on and demounted from an eyeglass frame and which do not damage an appearance in a mounted state. According to an embodiment there is provided (1) a support member for a wearable instrument which is mounted on a user's head part in cooperation with an eyeglass frame, including: a head-contact portion that comes in contact with the user's head part; a temple-contact portion that comes in contact with a temple part of the eyeglass frame on a surface opposite of a side that the head-contact portion is disposed; an instrument-connection portion for a wearable instrument that is disposed on the side of the temple-contact portion, wherein the temple-contact portion has a first contact surface that comes in contact with a head side surface of the temple part.

The temple-contact portion may further have a second contact surface that is able to come in contact with the top surface of the temple part.

The temple-contact portion and the instrument-connection portion may be located in an ear-neighboring part of the user in a state where the wearable instrument is mounted on the user's head part.

The head-contact portion may have a curved shape along the shape of the user's head part.

The size in the left-right direction between the instrument-connection portion and the head-contact portion may be larger on the back side than on the front side when seen from the top side in a state where the wearable instrument is mounted on the user's head part.

The head-contact portion may include a front head-contact portion that is located on the front side of the ear-neighboring part.

The head-contact portion may include a back head-contact portion that is located on the back side of the ear-neighboring part.

At least a part of the head-contact portion and the temple-contact portion may be formed of a transparent resin.

The surface of the head-contact portion may be configured to have a surface treatment for raising a frictional coefficient to be higher than the temple-contact portion.

At least a part of the head-contact portion may be formed of a material having flexibility.

The instrument-connection portion may be configured so that the front portion of the wearable instrument is inclined to be lowered in the extending direction of the temple part and is connected to cross the temple part.

The instrument-connection portion may include a slidable connection portion that is connected to the wearable instrument so as to be slidable.

The slidable connection portion may be connected to the wearable instrument so as to be slidable forward and backward in the extending direction of the temple part.

The slidable connection portion may be connected to the wearable instrument so as to be slidable in a direction in which the front portion of the wearable instrument is inclined to be lowered in the extending direction of the temple part.

The support member for a wearable instrument may further include a battery container that contains a battery for the wearable instrument, and the instrument-connection portion may be provided with a power supply unit that supplies power to the wearable instrument from the battery contained in the battery container.

The head-contact portion may extend over the upper part and both sides of the ear in a state where the wearable instrument is mounted on the user's head part, and the head-contact portion, the instrument-connection portion, and the temple-contact portion may have a shape which is substantially axisymmetric in a front-back direction about a line segment passing through the center of the ear so as to be selectively mounted on both ear-neighboring portions of the user in a mirror-reversed manner.

The head-contact portion and the temple-contact portion may inversely serve as the temple-contact portion and the head-contact portion, respectively, and the instrument-connection portion may be disposed on both sides of the head-contact portion and the temple-contact portion so that the wearable instrument is able to be selectively mounted on both ear-neighboring portions of the user with the front and back sides fixed.

Further provided is a head-mounted wearable device which is mounted on a user's head part in cooperation with an eyeglass frame, including: a support member for a wearable instrument and a wearable instrument that is fixed or detachably connected to the instrument-connection portion of the support member for a wearable instrument.

The wearable device may be an image display device.

Hereinafter, various embodiments will be described with reference to the accompanying drawings. In the following description, a support member for a wearable instrument is alternatively referred to as a support member and a head-mounted wearable device is alternatively referred to as a wearable device.

First Embodiment

Figures 1B, 1C:
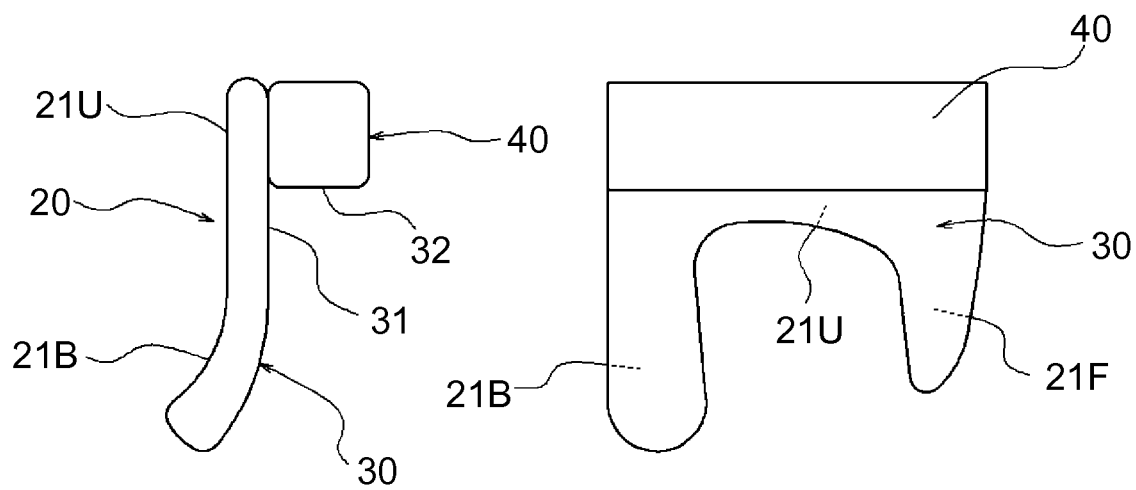

FIGS. 1A-1C illustrate a support member according to a first embodiment. The support member 10 according to this embodiment is mounted on a head (a side of the head part near an ear of a user in cooperation with an eyeglass frame and includes a head-contact portion 20, a temple-contact portion 30, and an instrument-connection portion 40. Here, the side of the head part near an ear is a portion of the side of the user's head part neighboring the ear of the user, such as the top, the back, and the front of an ear, regardless of the position thereof. In this regard, the direction "top" or "up" is considered to be towards a top of the head, the direction "back" is considered to be towards a back of the head and the direction "front" is considered to be towards the front or face of the head. FIGS. 1A-1C show a support member 10 for a right ear, where FIG. 1A is a plan view in which a side facing a user is set as a front side in a state where the support member is mounted on a head part, FIG. 1B is a back view thereof, and FIG. 1C is a left side view thereof.

The head-contact portion 20 comes in contact with a head part (side head part) near a right ear of a user in a state where the support member 10 is mounted on (securely worn by) the user, and includes an upper head-contact portion 21U corresponding to a portion of the user's head near an upper part of the right ear, a front head-contact portion 21F located on the front side thereof, and a back head-contact portion 21B located on the back side thereof, and has a curved shape along the shape of the head part as a whole (as shown in FIG. 1B). In this embodiment, the back head-contact portion 21B is longer in a direction away from the head-contact portion 21U than the front head-contact portion 21F.

The temple-contact portion 30 is formed on the surface side facing the head-contact portion 20 and has a first contact surface 31 that comes in contact with the side surface (inner side surface) of the temple part of the eyeglass frame on the head part side. In this embodiment, the temple-contact portion 30 further has a second contact surface 32 that is able to come in contact with the top surface of the temple part.

The instrument-connection portion 40 serves to be connected to a wearable instrument such as an image display device or an imaging device and is disposed on the side of the temple-contact portion 30 so as to be positioned on the upper side of the side of the user's head near the ear in a state where the support member 10 is mounted. When seen from the upper side in a state where the support member 10 is mounted (see FIG. 1A), the size in the left-right direction on FIG. 1A between the instrument-connection portion 40 and the head-contact portion 20 is larger than on the back side than on the front side.

In the support member 10, at least a part of the head-contact portion 20 may be formed of a resin having flexibility such as an elastomer. In this embodiment, the support member 10 is formed of a resin having flexibility as a whole. The instrument-connection portion 40 may be formed of a resin having a greater rigidity than the head-contact portion 20 and the temple-contact portion 30. At least a part of the head-contact portion 20 and the temple-contact portion 30 can be formed of a transparent resin. The surface of the head-contact portion 20 can be subjected to a surface treatment, such as pearskin finishing, for raising a frictional coefficient of the surface of the head-contact portion 20 to more greater than a frictional coefficient of the temple-contact portion 30.

Figure 2A:
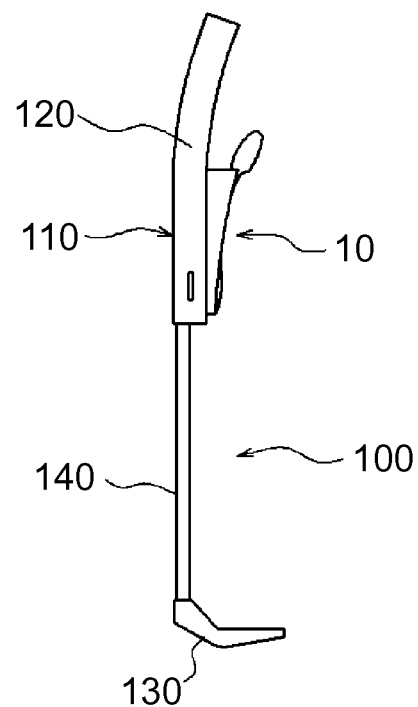
FIG. 2A-2C illustrate a wearable device including the support member shown in FIGS. 1A-1C.
Figure 2B:
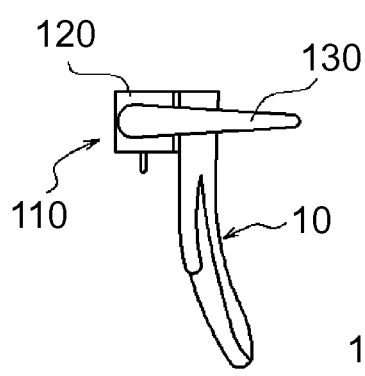
Figure 2C:
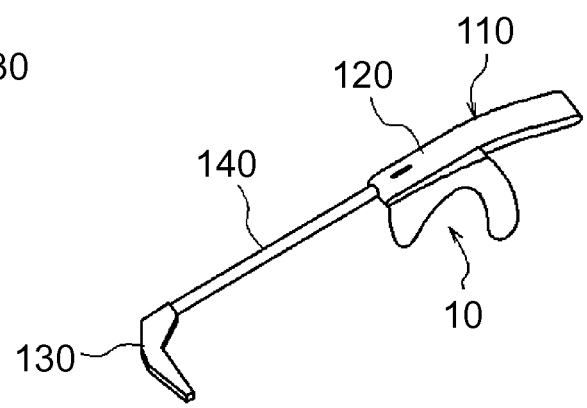

FIGS. 2A-2C illustrate a wearable device including the support member 10 according to the first embodiment. The wearable device 100 is constructed by fixedly or detachably connecting an image display device 110 as a wearable instrument to the instrument-connection portion 40 of the support member 10. FIGS. 2A and 2B are a plan view and a front view, respectively, when the side facing the user is set as the front side in a state where the support member is mounted on the head, and FIG. 2C is a perspective view thereof.

The image display device 110 includes a body section 120 that has a power supply circuit or a drive circuit built therein, a display optical system unit 130 that has a display device such as a liquid crystal display device and a projection optical system projecting the display image to a user's eyeball to form an enlarged virtual image, and a link section 140 that links the body section 120 to the display optical system unit 130.

Figure 3:
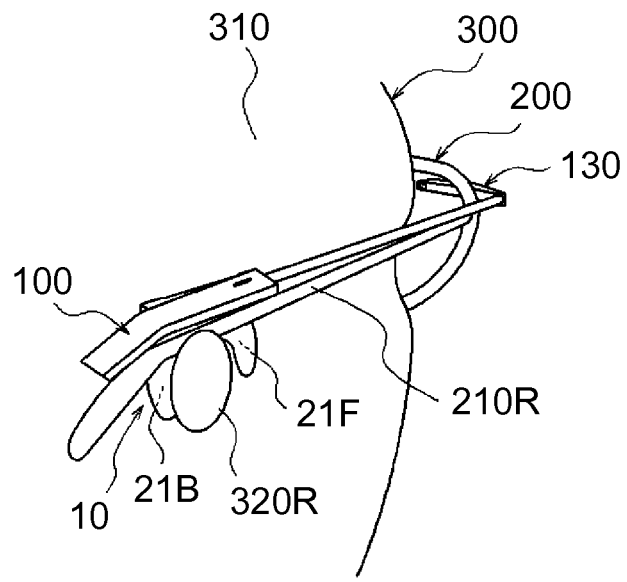
FIG. 3 is a perspective view illustrating a state where the wearable device shown in FIGS. 2A-2C is mounted on a head part when seen obliquely from the backside.
Figure 4:
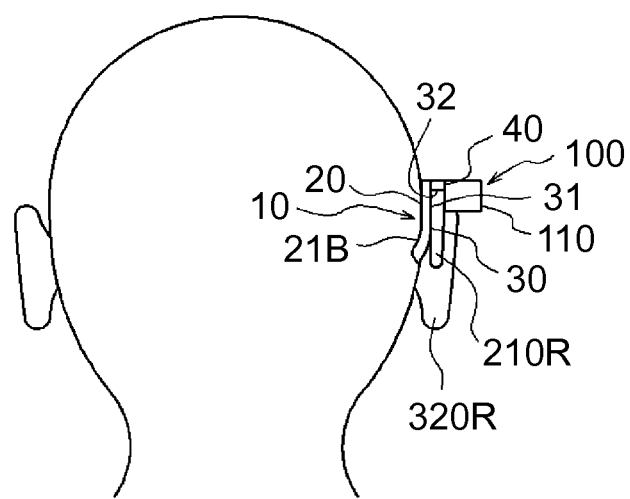
FIG. 4 is a diagram illustrating a state where the wearable device shown in FIGS. 2A-2C is mounted on the head part when seen from the back side.
Figure 5:
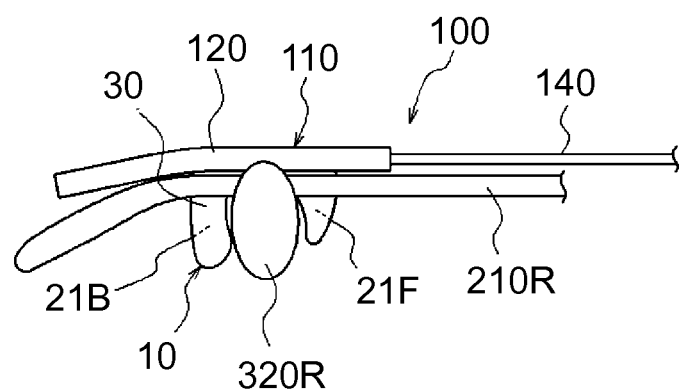
FIG. 5 is a partially-omitted side view illustrating a state where the wearable device shown in FIGS. 2A-2C is mounted on the head part when seen from the left side.

Hereinafter, the operation advantages of the support member 10 and the wearable device 100 will be described with reference to FIGS. 3 to 5. FIG. 3 is a perspective view illustrating a state where the wearable device 100 is mounted on the head part when seen obliquely from the back side, FIG. 4 is a view when seen from the back side, and FIG. 5 is a left side view illustrating wearable device from which some portions are omitted.

The support member 10 is mounted (i.e., securely worn by the user) on the head part 310 by inserting the head-contact portion 20 and the temple-contact portion 30 into the neighboring portion of an ear 320R between the head part 310 of the user 300 and the temple part 210R of the eyeglass frame 200 in a state where the user 300 wears the eyeglass frame 200 or in cooperation with the operation of wearing the eyeglass frame 200. Alternatively, the support member 10 is as the wearable device 100 connected to the image display device 110 on the head part 310 similarly.

In this embodiment, the support member 10 is mounted so that the upper head-contact portion 21U of the head-contact portion 20 is located over the root part of the ear 320R (corresponding to a direction towards a top of the user's head), the front head-contact portion 21F is located on the front side (corresponding to a direction towards a face of the user), and the back head-contact portion 21B is located on the back side (corresponding to a direction towards a back of the user's head) in a state where the support member 10 is mounted. In the state where the support member 10 is mounted, the image display device 110 is connected to the instrument-connection portion 40 so as to extend substantially in parallel to the temple part 210R.

According to this embodiment, by bringing the side surface (inner side surface) of the temple part 210R facing the head part in contact with the first contact surface 31 of the temple-contact portion 30, the head-contact portion 20 and the temple-contact portion 30 are pressed from the outside to the inside (to the user's head part) by the temple part 210R. Accordingly, the support member 10 is fixed in a state where the support member 10 is interposed between the head part 310 and the temple part 210R. When the support member 10 is mounted separately, the image display device 110 is connected to the instrument-connection portion 40 after the mounting of the support member 10.

When the support member 10 or the wearable device 100 is removed from the head part 310, it can be detached from the head part 310 by pulling out the support member 10 between the head part 310 and the temple part 210R. Therefore, since the support member or the wearable device does not need to be clipped or screwed to the eyeglass frame 200 as in the conventional art, the support member or the wearable device can be easily attached to and detached from the eyeglass frame 200 and the appearance of the support member and wearable device in the mounted state is not damaged.

Since the support member 10 is sandwiched between the head part 310 and the temple part 210R of the eyeglass frame 200, the support member 10 is prevented from moving in parallel in the horizontal direction or rotationally moving (yawing) in the horizontal direction. When the support member 10 is inserted so that the top surface of the temple part 210R comes in contact with the second contact surface 32 of the temple-contact portion 30, the support member 10 can be pressed against the top surface of the temple part 210R from the upside by the weight of the support member 10 and the weight of the image display device 100. Accordingly, it is possible to prevent inclination (pitching) in the vertical direction or rolling and thus to fix the support member more stably.

Since the head-contact portion 20 has a curved shape (see FIG. 1B) along the shape of the head part as a whole, it is possible to enhance the contact area with the head part 310. Accordingly, it is possible to more stably maintain the mounted state.

In the instrument-connection portion 40, the size from the head-contact portion 20 in the left-right direction on FIG. 1A in a state where the support member 10 is mounted is larger on the back side than on the front side. That is, the support member 10 has a shape corresponding to a state where the upper space of the ear 320R of the user 300 is broader on the back side than on the front side. Accordingly, the head-contact portion 20 can be made to have a shape better corresponding to the head part 310. As a result, it is possible to enhance the contact area with the head part 310 and thus to more stably maintain the mounted state of the support member 10 and the wearable device 100 without causing an undesired positional departure.

The head-contact portion 20 includes the front head-contact portion 21F located on the front side of the ear 320R of the user 300 and the back head-contact portion 21B located on the back side in the state where the support member 10 is mounted on the user 300. Accordingly, when an undesired force acts on the back side of the support member 10, the support member can be supported by the front head-contact portion 21F so as not to deform the support member 10. On the contrary, when an undesired force acts on the front side of the support member 10, the support member 10 can be supported by the back head-contact portion 21B so as not to deform the support member 10. Therefore, it is possible to more stably maintain the mounted state of the support member 10 and the wearable device 100.

Since at least a part of the head-contact portion 20 and the temple-contact portion 30 can be formed of a transparent resin, the transparent portion is inconspicuous and it is thus possible to prevent the appearance from being damaged. Since the surface of the head-contact portion 20 has a frictional coefficient higher than that of the temple-contact portion 30 through the surface treatment, it is possible to effectively maintain the contact state with the head part 310. Accordingly, it is possible to more stably maintain the mounted state of the support member 10 and the wearable device 100 without causing an undesired positional departure.

Since the support member 10 can be formed of a resin having flexibility such as elastomer, the head-contact portion 20 can be brought into contact with the head part 310 along the shape of the head part 310. Accordingly, it is possible to improve the mounting ability and to secure the contact area with the head part 310 as much as possible, thereby more stably maintaining the mounted state of the support member 10 and the wearable device 100. By forming the support member 10 out of a resin, it is possible to reduce the entire weight thereof.

Second Embodiment

Figure 6:
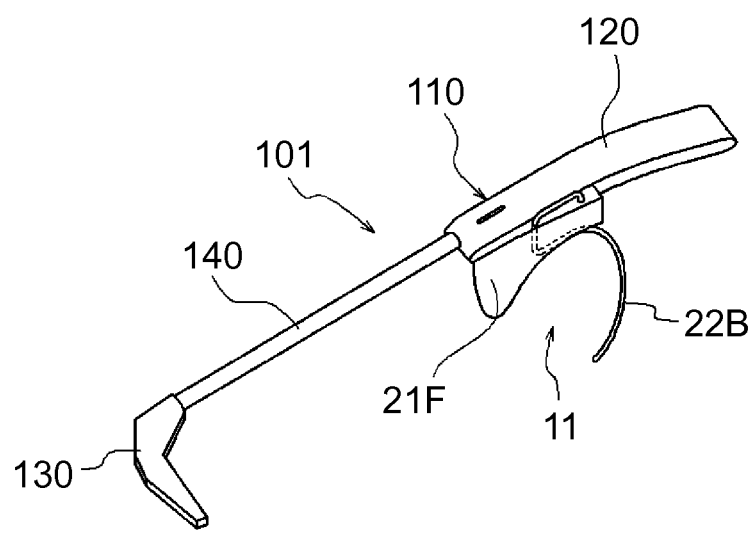
FIG. 6 is a perspective view illustrating a wearable device including a support member according to a second embodiment.

FIG. 6 is a perspective view illustrating a wearable device including a support member according to a second embodiment. The support member 11 of the wearable device 101 is different from the support member 10 according to the first embodiment in the configuration of the support member 11. In the support member 11 according to this embodiment, the back head-contact portion 21B of the head-contact portion 20 in the support member 10 according to the first embodiment is formed in an arc shape so as to be fit to the root shape of the ear (the portion of the ear that connects to the head) by a flexible wire member 22B. Since the other configurations are the same as in the first embodiment, the same elements will be referenced by the same reference numerals and description thereof will not be repeated.

In this way, by forming the back head-contact portion of the head-contact portion 20 in an arc shape so as to be fit to the root shape of the ear by a flexible wire member 22B, it is possible to more stably mount the support member 11 and the wearable device 101 on the user's head part. In this embodiment, the portion of the head-contact portion 20 other than the flexible wire member 22B may be formed of a non-flexible material. In this case, since the flexible wire member 22B effectively comes in contact with the head part, it is possible to stably mount the support member 11 and the wearable device 101 on the user's head part.

Third Embodiment

Figure 7:
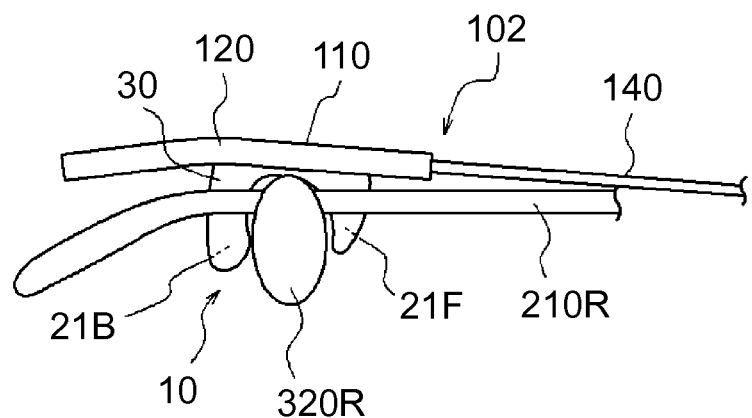
FIG. 7 is a partial side view illustrating a wearable device including a support member according to a third embodiment.

FIG. 7 is a partial side view illustrating a wearable device including a support member according to a third embodiment. In the wearable device 102, the front portion of the image display device 110 in a state where the wearable device 100 according to the first embodiment is mounted on the head part is inclined to be lowered in the extending direction of the temple part 210R so as to cross the temple part 210R and is connected to the instrument-connection portion 40 of the support member 10. Accordingly, the instrument-connection portion 40 is formed so that the front portion of the instrument-connection portion 40 is lowered with respect to the back portion when the front portion thereof is inclined to be lowered, that is, when the face side relative to the ear is defined as the front side. Since the other configurations are the same as in the first embodiment, the same elements will be referenced by the same reference numerals and description thereof will not be repeated.

By employing this configuration, since the observation position of the enlarged virtual image through the use of the display optical system unit 130 of the image display device 110 can be set to a lower position at which the enlarged virtual image is more visible from the front position of the user, it is possible for a user to observe the display image without any uncomfortable feeling. This configuration can be similarly applied to the wearable device 101 according to the second embodiment.

Fourth Embodiment

Figure 8A:
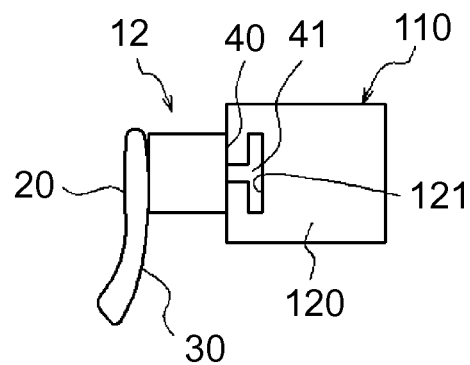
FIGS. 8A and 8B illustrate a support member according to a fourth embodiment.
Figure 8B:
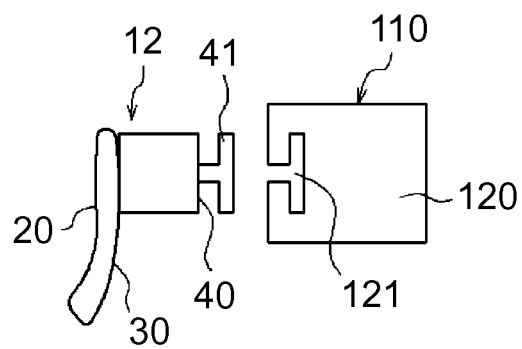

FIGS. 8A and 8B illustrate a support member according to a fourth embodiment. In the support member 12, the image display device 110 is connected to the support member 10 according to the first embodiment so as to be slidable forward and backward in the extending direction of the temple part. Accordingly, the instrument-connection portion 40 is provided with a convex slidable connection portion 41. The body section 120 of the image display device 110 is provided with a concave slidable engagement portion 121 with which the slidable connection portion 41 engages so as to extend in the sliding direction. FIG. 8A shows a state where the slidable engagement portion 121 engages with the slidable connection portion 41 and the image display device 110 is connected to the instrument-connection portion 40 so as to be slidable. FIG. 8B shows a state where the engagement of the slidable engagement portion 121 with the slidable connection portion 41 is released and the image display device 110 is detached from the instrument-connection portion 40.

In this way, when the image display device 110 is connected to the instrument-connection portion 40 so as to be slidable forward and backward in the extending direction of the temple part, it is possible to cope with various head sizes of users. Accordingly, since a gap in the front-back direction occurring when the display image (observation image) from the image display device 110 moves to the user's favorite position of view can be adjusted, it is possible to provide an easily-visible image to the user.

Figure 9:
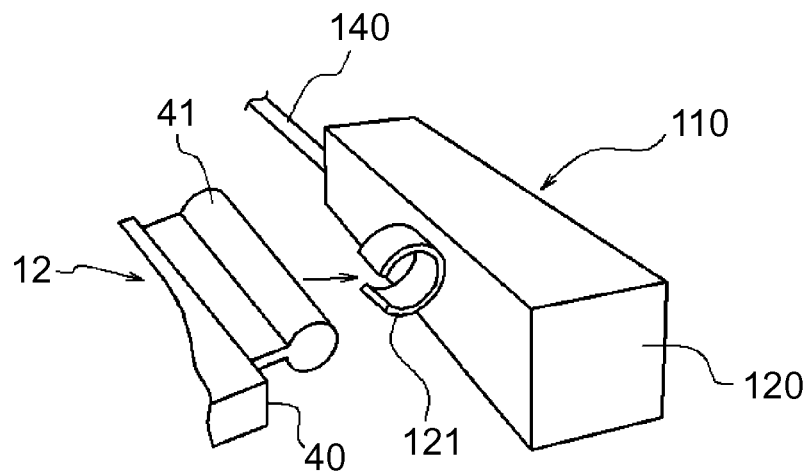
FIG. 9 is a partial perspective view illustrating a modification example of the support member according to the fourth embodiment.

In FIGS. 8A and 8B, the slidable connection portion 41 is formed in a convex cross-sectional shape of a T shape, but the slidable connection portion 41 may be formed in a cylindrical shape as shown in the partial perspective view of FIG. 9. In this case, the slidable engagement portion 121 of the image display device 110 is formed in a hollow arc shape and is inserted from an end face of the slidable connection portion 41 in the axis direction to engage with each other, or is pushed in from the circumferential surface of the slidable connection portion 41 to engage with each other using an elastic deformation of the slidable engagement portion 121, whereby the image display device 110 is connected to the instrument-connection portion 40 of the support member 10 so as to be slidable.

In this way, when the slidable connection portion 41 is formed in a cylindrical shape, it is possible to adjust rotational movement of the image display device 110 about the front-back direction as well as movement in the user's front-back direction. Accordingly, it is possible to display an image at a position easily visible by a user or a desired position.

Figure 10:
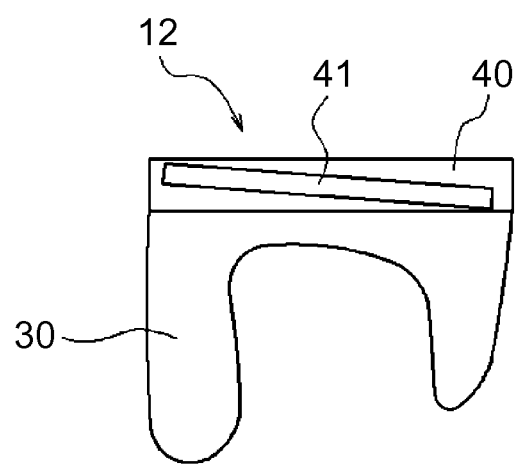
FIG. 10 is a partial perspective view illustrating another modification example of the support according to the fourth embodiment.

The sliding direction of the image display device 110 is not limited to the front-back direction along the temple part, but can be set to a front-back direction in which the front portion is inclined to be lowered about the extending direction of the temple part. In this case, for example, as shown in FIG. 10, the slidable connection portion 41 of the instrument-connection portion 40 has only to be formed so that the front portion thereof is inclined to be lowered. The configurations shown in FIGS. 8 to 10 can be similarly applied to the support member according to the second or third embodiment. The concave-convex relationship between the slidable connection portion 41 of the instrument-connection portion 40 and the slidable engagement portion 121 of the image display device 110 may be inverted.

Fifth Embodiment

Figure 11A:
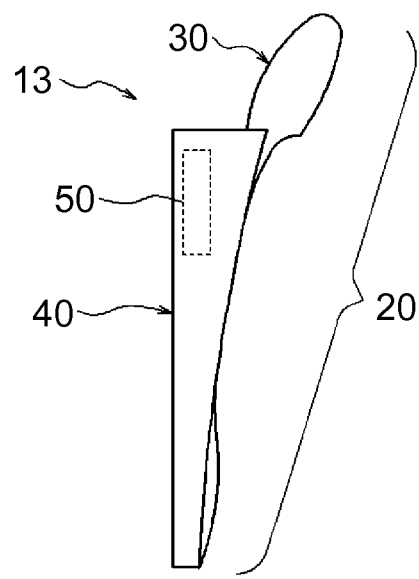
FIGS. 11A-11C illustrate a support member according to a fifth embodiment.
Figure 11B:
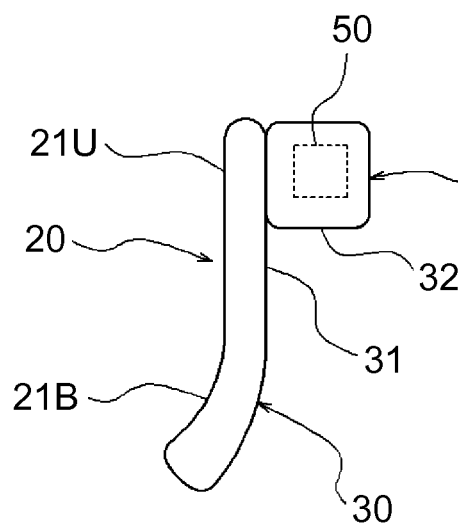
Figure 11C:
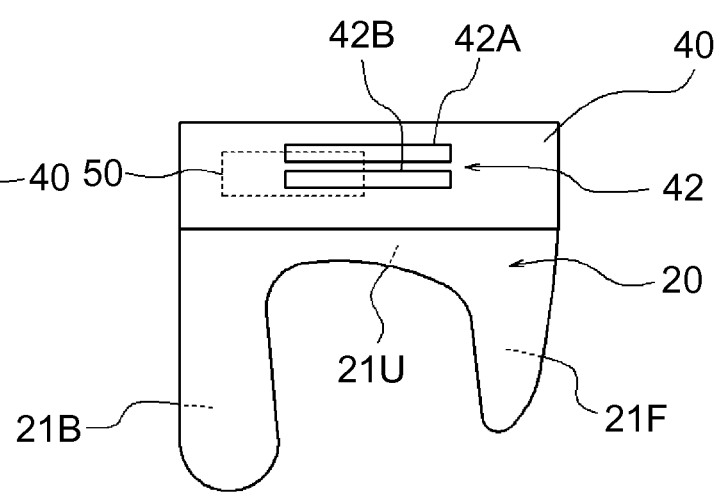

FIGS. 11A-11C illustrate a support member according to a fifth embodiment. The support member 13 includes a battery container 50 that contains a battery usable for the image display device between the temple-contact portion 30 and the instrument-connection portion 40 in the support member 10 according to the first embodiment. The battery container 50 is configured, for example, to interchangeably contain a battery. FIGS. 11A to 11C are a plan view, a back view, and a left side view, respectively, when a side facing a user is set as a front side in a state where the support member is mounted on the head part, similarly to FIGS. 1A to 1C.

Figure 12:
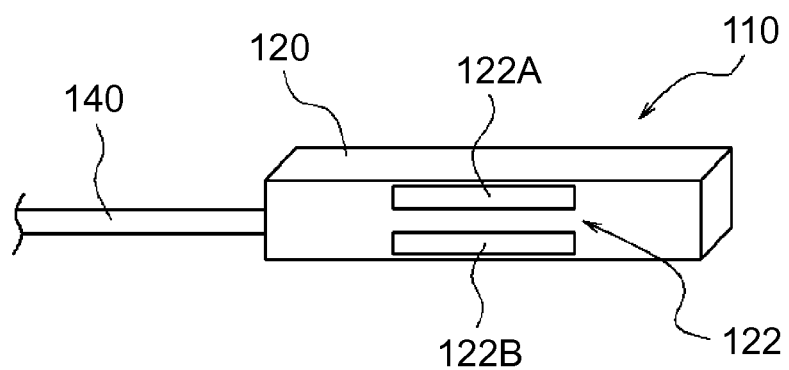
FIG. 12 is a diagram illustrating a configuration of an electrode portion on a side of an image display device connected to the support member according to the fifth embodiment.

As shown in FIG. 11C, the instrument-connection portion 40 is provided with a power supply unit 42 that supplies power from the battery contained in the battery container 50 to the image display device. The power supply unit 42 is provided with a positive electrode portion 42A and a negative electrode portion 42B vertically separated from each other. In this case, as shown in FIG. 12, the body section 120 of the image display device 110 is provided with a power supply unit 122 including a positive electrode portion 122A and a negative electrode portion 122B coming in contact with the power supply unit 42 of the instrument-connection portion 40.

By employing this configuration, since the image display device 110 does not need to be charged with a battery, it is possible to achieve a decrease in size and a decrease in weight of the image display device 110. By mounting a battery on the support member 10, the battery is located in the vicinity of the root of the ear in a state where the support member is mounted on the head part. As a result, it is possible to prevent inclination and rotation due to the weight of the image display device 110, compared with the case where the battery is mounted on the image display device 110. Since the decrease in size of the image display device 110 is achieved, it is possible to prevent damage of an appearance thereof.

Figure 13A:
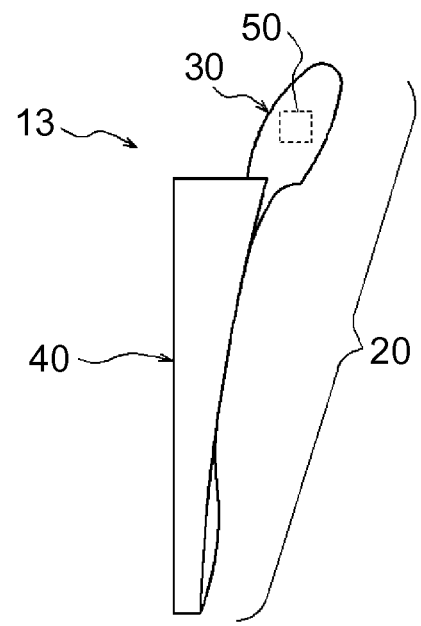
FIGS. 13A-13C illustrate a modification example of the support member according to the fifth embodiment.
Figure 13B:
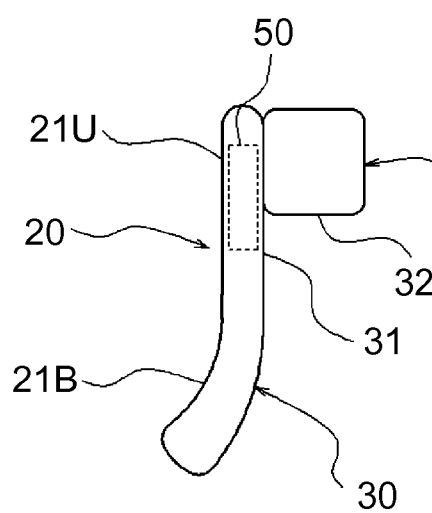
Figure 13C:
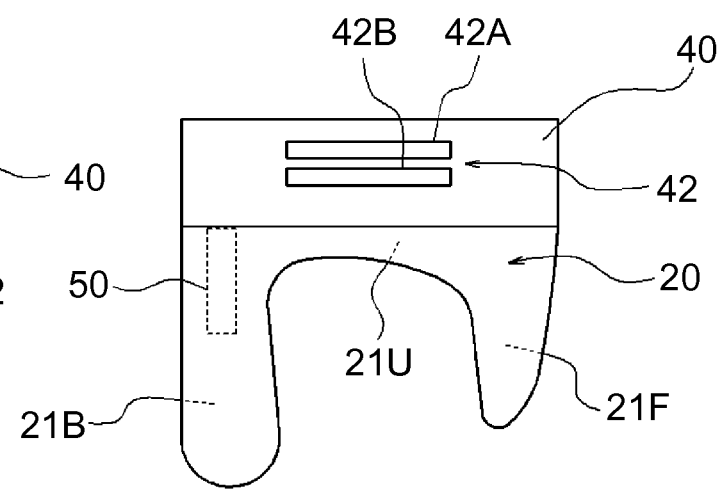

The battery container 50 may alternatively be disposed between the back head-contact portion 21B of the head-contact portion 20 and the temple-contact portion 30 as shown in FIGS. 13A to 13C. In this case, the battery contained in the battery container 50 may be made to serve as a counter balance of the image display device 110 connected to the instrument-connection portion 40. Accordingly, it is possible to further improve the mounting ability of the wearable device 100.

The configurations shown in FIGS. 11A-11C and 13A-13C can be similarly applied to the support members according to the other embodiments. Here, as described in the fourth embodiment, when the image display device 110 is connected to be slidable, at least the power supply unit 42 of the instrument-connection portion 40 is formed to extend in the sliding direction of the image display device 110, and the positive electrode portion 42A and the negative electrode portion 42B are disposed to oppose each other in the direction perpendicular to the sliding direction.

Sixth Embodiment

Figure 14A:
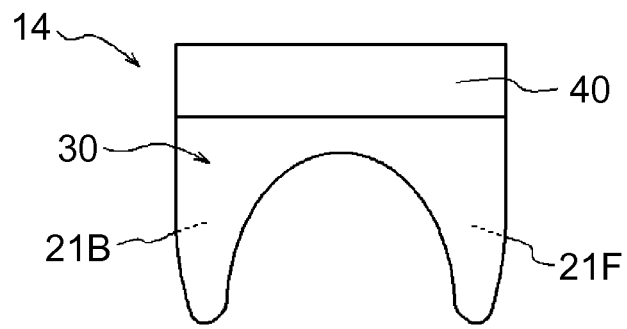
FIGS. 14A-14C illustrate a support member according to a sixth embodiment.
Figure 14B:
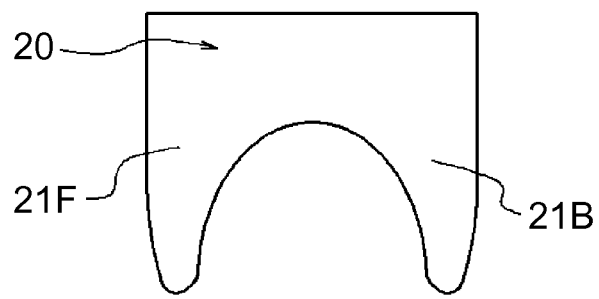
Figure 14C:
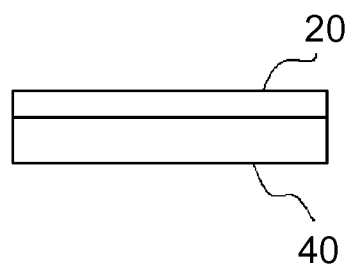

FIGS. 14A-14C illustrate a support member according to a sixth embodiment. The support member 14 allows the support member 10 according to the first embodiment to be used commonly for the right and left side ears. Accordingly, in the support member 14, unlike the first embodiment, the head-contact portion 20 does not have a curved shape and the vertical lengths of the front head-contact portion 21F and the back head-contact portion 21B in the state where the support member mounted on the head part are substantially equal to each other. That is, the support member 14 has substantially an axisymmetric shape in the front-back direction about a line segment passing through the center of the ear in the state where the support member is mounted on the head part. FIG. 14A is a view of the support member 14 when seen from the side of the instrument-connection portion 40, FIG. 14B is a view of the support member 14 when seen from the side of the head-contact portion 20, and 14C is a top view of FIG. 14A.

Figure 15A:
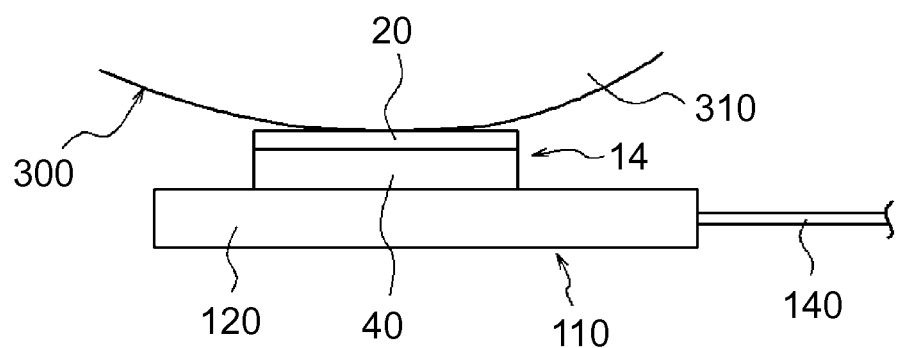
FIGS. 15A and 15B illustrate a usage of the support member according to the sixth embodiment.
Figure 15B:
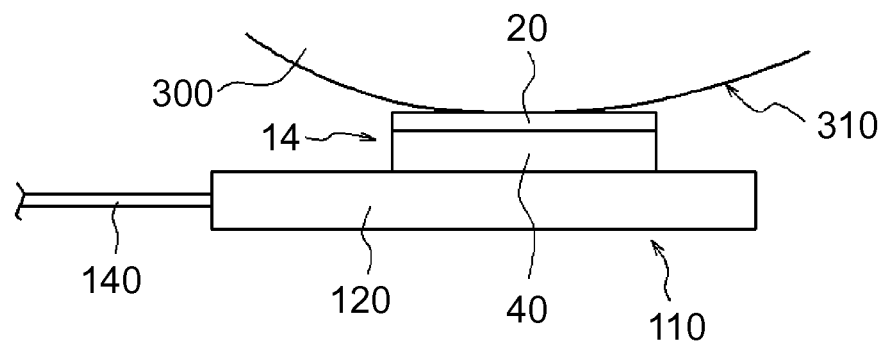

According to the support member 14, when the support member is mounted on the head part 310 of a user 300 as shown in FIG. 15A so that the front head-contact portion 21F of the head-contact portion 20 is located on the front side of the right ear of the user and the back head-contact portion 21B is located on the back side, it is possible to support the image display device 110 on the right side of the head part 310. When the support member 14 is reversed in the front-back direction from the state shown in FIG. 15A and is mounted on the head part 310 as shown in FIG. 15B, it is possible to support the image display device 110 on the left side of the head part 310. In this case, the front head-contact portion 21F and the back head-contact portion 21B are inverted in functions. Therefore, since the user 300 can selectively mount the support member 14 on the right side or the left side of the head part 310, it is possible to improve usability. This configuration can also be applied to the third to fifth embodiments.

Seventh Embodiment

Figure 16A:
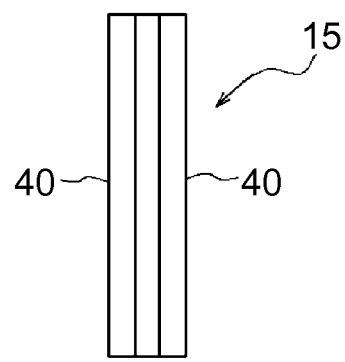
FIGS. 16A-16C illustrate a support member according to a seventh embodiment.
Figure 16B:
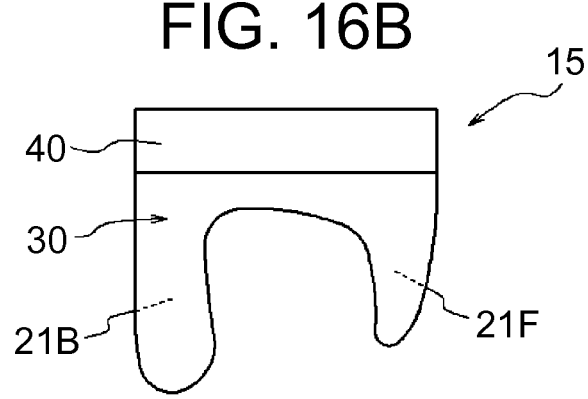
Figure 16C:
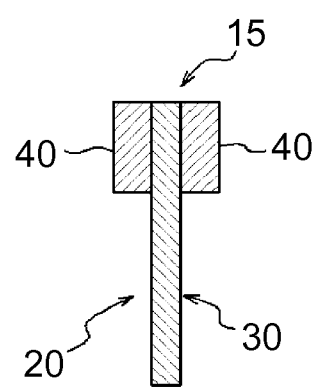

FIGS. 16A-16C is a diagram illustrating a support member according to a seventh embodiment. The support member 15 is configured to be used commonly for the right and left side ears, similarly to the support member 14 according to the sixth embodiment, but is used commonly for the right and left sides without being inverted in the front-back direction of the support member 15 in this embodiment. Accordingly, as in the first embodiment, the head-contact portion 20 of the support member 15 does not have a curved shape. The instrument-connection portions 40 are disposed on both sides of the head-contact portion 20 and the temple-contact portion 30. FIG. 16A is a view of the support member 15 in a state where the support member is mounted on the head part when seen from the top surface, FIG. 16B is a view thereof when seen from the side of the temple-contact portion 30, and FIG. 16C is a view thereof when seen from the back side.

Figure 17A:
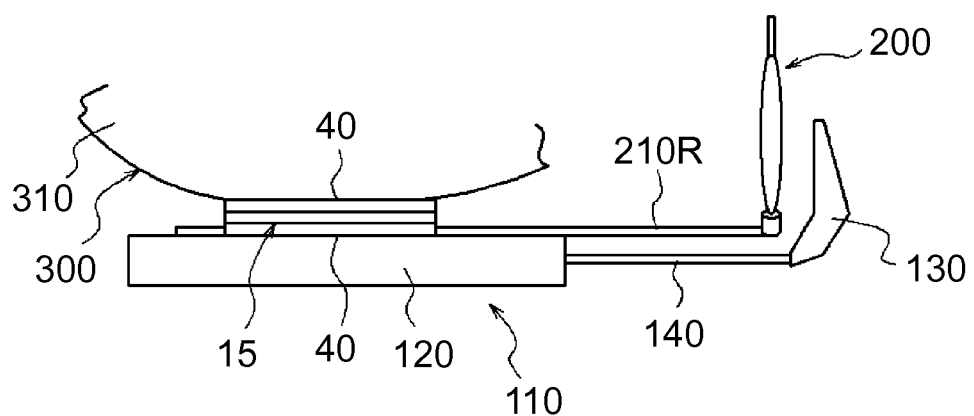
FIGS. 17A and 17B illustrate a usage of the support member according to the seventh embodiment.
Figure 17B:
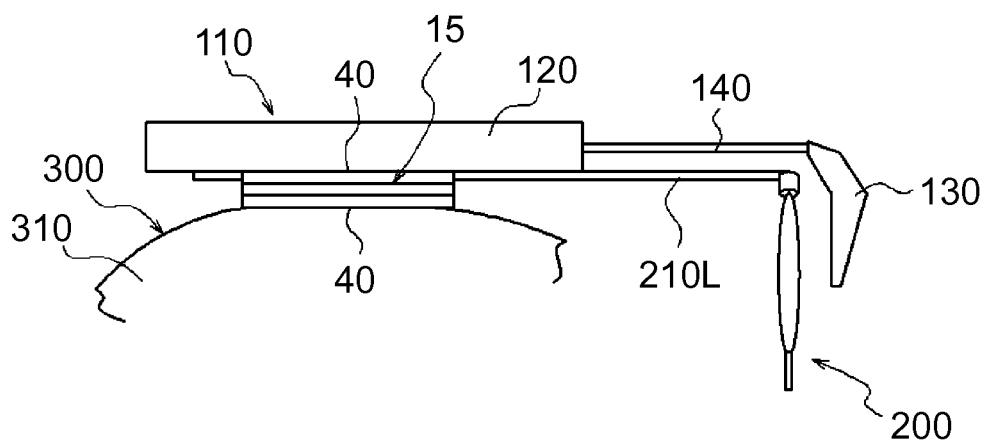

According to the support member 15, when the support member is mounted on the head part 310 of a user 300 as shown in FIG. 17A so that the front head-contact portion 21F of the head-contact portion 20 is located on the front side of the right ear of the user and the back head-contact portion 21B is located on the back side, it is possible to support the image display device 110 on the right side of the head part 310 in cooperation with the temple part 210R. When the support member 15 is not inverted in the front-back direction from the state shown in FIG. 17A and is mounted on the head part 310 as shown in FIG. 17B, it is possible to support the image display device 110 on the left side of the head part 310 in cooperation with the temple part 210L. In this case, the head-contact portion 20 and the temple-contact portion 30 are inverted in functions. The instrument-connection portion 40 not connected to the image display device 110 and located inside serves as the head-contact portion.

In this way, since the support member 15 according to this embodiment can be selectively mounted on the right side or the left side of the head part 310 without being inverted in the front-back direction, it is possible to further improve usability. This configuration can also be applied to the third to fifth embodiments.

The present invention is not limited to the above-mentioned embodiments, but can be modified or changed in various forms. For example, the wearable device is not limited to the image display device 110, but may be other wearable devices such as an imaging device. The front head-contact portion 21F or the back head-contact portion 21B of the head-contact portion 20 can be appropriately omitted.

REFERENCE SIGNS LIST 10, 11, 12, 13, 14, 15: support member
20: head-contact portion
21U: upper head-contact portion
21F: front head-contact portion
21B: back head-contact portion
22B: flexible wire member
30: temple-contact portion
31: first contact surface
32: second contact surface
40: instrument-connection portion
41: slidable connection portion
42: power supply unit
50: battery container
100, 101, 102: wearable device
110: image display device
120: body section
121: slidable engagement portion
122: power supply unit
130: display optical system unit
140: link section 200: eyeglass frame
210R, 210L: temple part
300: user
310: head part
320R: ear

What is claimed is:

1. A support member for a wearable instrument, the support member comprising:
a body mounted on a user's head for use with an eyeglass frame, the body having:
a head-contact portion having a first body surface in a first side of the body configured to come in contact with the user's head;
a temple-contact portion having a second surface in a second side of the body configured to come in contact with a temple part of the eyeglass frame, the second side opposing the first side; and
an instrument-connection portion for connecting to a wearable instrument, the instrument-connection portion being disposed on the second side of the body,
wherein the temple-contact portion has a first contact surface configured to come in contact with a side surface of the temple part.

2. The support member for a wearable instrument according to claim 1, wherein the temple-contact portion further has a second contact surface that is able to come in contact with the top surface of the temple part.

3. The support member for a wearable instrument according to claim 1, wherein the temple-contact portion and the instrument-connection portion is located in an ear-neighboring part of the user in a state where the wearable instrument is mounted on the user's head.

4. The support member for a wearable instrument according to claim 3, wherein the head-contact portion includes a front head-contact portion that is located on the front side of the ear-neighboring part.

5. The support member for a wearable instrument according to claim 3, wherein the head-contact portion includes a back head-contact portion that is located on the back side of the ear-neighboring part.

6. The support member for a wearable instrument according to claim 1, wherein the head-contact portion has a curved shape along the shape of the user's head.

7. The support member for a wearable instrument according to claim 1, wherein the size in the left-right direction between the instrument-connection portion and the head-contact portion is larger on the back side than on the front side when seen from the top side in a state where the wearable instrument is mounted on the user's head.

8. The support member for a wearable instrument according to claim 1, wherein at least a part of the head-contact portion and the temple-contact portion is formed of a transparent resin.

9. The support member for a wearable instrument according to claim 1, wherein a surface of the head-contact portion is subjected to surface treatment for raising a frictional coefficient to be higher than the temple-contact portion.

10. The support member for a wearable instrument according to claim 1, wherein at least a part of the head-contact portion is formed of a material having flexibility.

11. The support member for a wearable instrument according to claim 1, wherein the instrument-connection portion is configured so that the front portion of the wearable instrument is inclined to be lowered in the extending direction of the temple part and is connected to the temple part to cross the temple part.

12. The support member for a wearable instrument according to claim 1, wherein the instrument-connection portion includes a slidable connection portion that is connected to the wearable instrument so as to be slidable.

13. The support member for a wearable instrument according to claim 12, wherein the slidable connection portion is connected to the wearable instrument so as to be slidable forward and backward in the extending direction of the temple part.

14. The support member for a wearable instrument according to claim 12, wherein the slidable connection portion is connected to the wearable instrument so as to be slidable in a direction in which the front portion of the wearable instrument is inclined to be lowered in the extending direction of the temple part.

15. The support member for a wearable instrument according to claim 1, further comprising a battery container that contains a battery for the wearable instrument,
wherein the instrument-connection portion is provided with a power supply unit that supplies power to the wearable instrument from the battery contained in the battery container.

16. The support member for a wearable instrument according to claim 1, wherein the head-contact portion extends over the upper part and both sides of the ear in a state where the wearable instrument is mounted on the user's head, and
wherein each of the head-contact portion, the instrument-connection portion, and the temple-contact portion has a shape which is substantially axisymmetric in a front-back direction about a line segment passing through the center of the ear so as to be selectively mounted on both ear-neighboring portions of the user in a mirror-reversed manner.

17. The support member for a wearable instrument according to claim 1, wherein the head-contact portion and the temple-contact portion inversely serve as the temple-contact portion and the head-contact portion, respectively, and
wherein the instrument-connection portion is disposed on both sides of the head-contact portion and the temple-contact portion so that the wearable instrument is able to be selectively mounted on both ear-neighboring portions of the user with the front and back sides fixed.

18. A head-mounted wearable device which is mounted on a user's head in cooperation with an eyeglass frame, comprising:
the support member for a wearable instrument according to claim 1; and
a wearable instrument that is fixed or detachably connected to the instrument-connection portion of the support member for the wearable instrument.

19. The head-mounted wearable device according to claim 18, wherein the wearable device is an image display device.

20. A support member for a wearable instrument which is mounted on a user's head part in cooperation with an eyeglass frame, comprising:
a head-contact portion that comes in contact with the user's head part;
a temple-contact portion that comes in contact with a temple part of the eyeglass frame on a surface opposite of the head-contact portion;
an instrument-connection portion for a wearable instrument that is disposed on the side of the temple-contact portion,
wherein the temple-contact portion has a first contact surface that comes in contact with a head-side surface of the temple part;

wherein the instrument-connection portion includes a slidable connection portion that is connected to the wearable instrument so as to be slidable.

* * * * *